United States Patent
Stead et al.

(10) Patent No.: US 9,391,982 B1
(45) Date of Patent: Jul. 12, 2016

(54) NETWORK AUTHENTICATION OF MULTIPLE PROFILE ACCESSES FROM A SINGLE REMOTE DEVICE

(71) Applicant: Cullen/Frost Bankers, Inc., San Antonio, TX (US)

(72) Inventors: James M. Stead, San Antonio, TX (US); Arun Muthukrishnan, San Antonio, TX (US); Michael R. Johnson, Poth, TX (US); Laurie A. Rivera, San Antonio, TX (US); Selina D. Bilyeu, San Antonio, TX (US)

(73) Assignee: Cullen/Frost Bankers, Inc., Houston, TX (US)

( * ) Notice: Subject to any disclaimer, the term of this patent is extended or adjusted under 35 U.S.C. 154(b) by 2 days.

(21) Appl. No.: 14/192,419

(22) Filed: Feb. 27, 2014

(51) Int. Cl.
*H04L 29/06* (2006.01)

(52) U.S. Cl.
CPC ........ *H04L 63/0838* (2013.01); *H04L 63/0807* (2013.01); *H04L 63/126* (2013.01); *H04L 63/18* (2013.01)

(58) Field of Classification Search
CPC ........... G06Q 20/3223; G06Q 20/3224; G06F 21/6218; G06F 21/31; H04L 63/0807; H04L 63/18; H04L 63/126; H04L 63/0838
USPC .......................................................... 726/9
See application file for complete search history.

(56) References Cited

U.S. PATENT DOCUMENTS

| | | | |
|---|---|---|---|
| 5,485,519 A | 1/1996 | Weiss | |
| 6,557,104 B2 | 4/2003 | Vu et al. | |
| 8,234,381 B1 | 7/2012 | Jonker et al. | |
| 8,510,811 B2 | 8/2013 | Kuang et al. | |
| 8,635,684 B2 | 1/2014 | Thun | |
| 2007/0220253 A1* | 9/2007 | Law | 713/168 |
| 2008/0028447 A1* | 1/2008 | O'Malley et al. | 726/6 |
| 2008/0148377 A1* | 6/2008 | Kumar et al. | 726/9 |
| 2009/0072020 A1* | 3/2009 | Hull | 235/379 |
| 2009/0138953 A1* | 5/2009 | Lyon | 726/9 |
| 2012/0072979 A1* | 3/2012 | Cha et al. | 726/7 |

(Continued)

OTHER PUBLICATIONS

"Proxy server," http://en.wikipedia.org/wiki/proxy_server, last modified Feb. 3, 2014, 10 pages.

(Continued)

*Primary Examiner* — Don Zhao
(74) *Attorney, Agent, or Firm* — Kevin L. Daffer; Matheson Keys Daffer & Kordzik PLLC

(57) ABSTRACT

A network authentication system and method is described for authenticating multiple profile accesses from a single remote device. A device remote from a web server, yet connected to the web server via, for example, the Internet, can allow multiple users to register their profiles within the device. The profiles are registered using a pre-existing user ID and password corresponding to, for example, the user's financial accounts. Multiple profiles and, specifically, the indicia of those profiles, can appear on the display of the remote device allowing each user the ability to select their own registered profile. Access to a profile is granted when the user enters their private PIN. Once the PIN is entered, the private information such as financial account information will be securely forwarded from the web server to the remote device.

11 Claims, 6 Drawing Sheets

(56) References Cited

U.S. PATENT DOCUMENTS

| | | |
|---|---|---|
| 2012/0240220 A1* | 9/2012 | Smith .............................. 726/17 |
| 2013/0036454 A1* | 2/2013 | Purvis et al. ....................... 726/4 |
| 2013/0060708 A1* | 3/2013 | Oskolkov et al. ............... 705/75 |
| 2013/0097695 A1* | 4/2013 | Sipe et al. ........................ 726/17 |
| 2014/0189850 A1* | 7/2014 | Marshall ......................... 726/17 |
| 2015/0142974 A1* | 5/2015 | Bernaudin et al. ............ 709/225 |

OTHER PUBLICATIONS

"Public-key cryptography," http://en.wikipedia.org/wiki/public-key_cryptography, last modified Jan. 7, 2014, 13 pages.

"Software token," http://en.wikipedia.org/wiki/software_token, last modified Aug. 29, 2012, 2 pages.

\* cited by examiner

NETWORK AUTHENTICATION OF MULTIPLE PROFILE ACCESSES FROM A SINGLE REMOTE DEVICE

BACKGROUND OF THE INVENTION

1. Field of the Invention

This invention relates generally to the accessing of multiple profiles over a network and, more specifically, to authenticating the accessing of multiple profiles from only a single remote device and the communication of those profiles stored on a web server.

2. Description of the Related Art

The following descriptions and examples are given as background only.

Computers having relatively large storage capacity are oftentimes referred to as servers. In a modern communication environment, most servers store website information as well as information pertinent to a user. Those servers are oftentimes referred to as web servers. Web servers not only store web information accessible to a user, but also store information confidential to that user. Such confidential information can include, for example, a profile of that user. For example, with online banking services, the profile might include information about various financial accounts, as well as access to and manipulation of those accounts.

Because of the confidential nature of certain profiles, it is critical that security of those accounts be maintained. Identity theft and man-in-the-middle attacks have become commonplace whenever a web server is accessible over a public communication network, including wireless networks. A popular form of such wired or wireless public communication networks is the Internet or Web.

A typical mechanism used to access a profile is for a user to provide their username and password. The username and password is entered into the device that is remote from yet connected to the web server via the Internet. Unfortunately, this type of authentication cannot sufficiently protect the profile information and is somewhat burdensome each time a user wishes to access their profile. Phishing and man-in-the-middle attacks, as well as keystroke logging, are problematic—especially if the remote device is readily accessible to a malicious user.

Certainly the most accessible type of remote device is a mobile device, e.g., personal digital assistants, smartphones, and other types of client devices which can be readily moved, yet can access the Internet. Like any client device, a remote device or mobile device, can easily download application programs. For example, devices can shop an application store over the Internet and thereafter download the desired application program, which then will reside as an icon on the graphical user interface of the device. The application program consists of code that can execute on an execution unit, CPU or processor, hereinafter referred to as "an execution unit." By executing the code, certain pieces of software, such as a software token, can be stored. If desired, the software token can be encrypted by executing software within the application program. The use of encrypted tokens and the generation of personal identification numbers aids in the authentication of the remote device and ensuring the user's confidential profile is protected against unauthorized access.

SUMMARY OF THE INVENTION

The problems associated with authenticating access to confidential user profiles is, in part, addressed through use of a unique combination of application programs, software tokens, and the encryption of those tokens resident on the remote device. Moreover, through use of encrypted tokens, multiple profile accesses can occur from a single remote device by entry of only a personal identification number (PIN) corresponding to each encrypted token. In this fashion, multiple users can access via the Internet multiple profiles on a web server. Alternatively, the same user can access multiple profiles that are distinct from each other, yet attributable to that user, by entering a unique PIN for each profile.

By downloading an application program onto the remote device and, thereafter, launching that application program, tokens attributable to each unique profile can be stored on the device by first creating a secure communication between the device and the web server. That secure communication can involve setting up a secure authentication, or "registration", procedure using, for example, secure socket layer (SSL) underpin upon the Internet standard of transport layer security (TLS). By entering a user ID and password attributable to a profile using the SSL/TLS protocols, a secure token can be sent from the web server to the remote device. The user ID and password can originate from a check card received and secretly held by the user, or can originate from the user's memory after having memorized the user ID and password given to the user. Knowing the user ID, the password can be changed by the user, if needed. Each token corresponds to a profile and the token stored in the device memory is encrypted or, alternatively, scrambled such that a malicious user cannot gain access to that token or tokens. A PIN attributable to each token and, therefore, each profile, is used to encrypt the token that is then stored as an encrypted token.

After registration is completed, and the token and PIN are attained for each profile, secure access to a selected profile is easily achieved using only the PIN. The same PIN used to encrypt the token, is thereafter used to decrypt the encrypted token. The PIN, however, is not persistently maintained in the device memory, but instead is maintained only in the user's memory and entered by the user each time access is desired. Even though the software token can be considered a public key, it is nonetheless protected when transmitted using SSL/TLS protocols.

By encrypting multiple tokens and storing those tokens on the remote device, the application program on that device allows registered multiple profile indicators to appear on the graphical user interface (GUI) of the remote device. As noted above, this process is known as "registration" or "registering the profiles." Thereafter, a user can access profiles stored on a web server via the Internet by first decrypting the stored encrypted tokens using a user-memorized PIN. By selecting various profile indicators on the GUI of the device and entering the PIN for a specific profile, the stored encrypted token is decrypted and a one-time password is generated. That one-time password associated with each profile is sent to the web server where access can then be granted to the corresponding profile. This process is known as "obtaining profiles" since many different users, or the same user with different profiles, can use a single remote device. After registering the profiles, a unique PIN is used for each profile to gain access to and thus obtain those profiles.

According to one embodiment, a device, such as a remote device, is provided. The device communicates with a communication network for receiving at least two user profiles from a web server linked to the device via the Internet. A user interface, such as a graphical user interface, is configured to receive a first PIN and a second PIN. A memory within the device can include a first token and a second token. In one embodiment, the first and second tokens can be encrypted tokens. An execution unit can be coupled to the memory for fetching the first and second tokens and, if encrypted, fetching the first and second encrypted tokens. A communication unit is coupled between the execution unit and the network for sending a first password generated from a combination of the first token and the first PIN, and thereafter a second password generated from a combination of the second token and the second PIN.

The first and second passwords are preferably one-time passwords that expire after a specified time, requiring regeneration of the passwords after expiration of the specific time. Upon sending the first and second passwords, the communication unit receives a first user profile associated with the first password and a second user profile associated with the second password. Entering a unique PIN for association with a unique profile and encrypted tokens is referred to as "registering profiles." Such registered profiles, or "profile indicators", are displayed on the user interface of the device and can be selected, and then a unique PIN is entered to gain access to the registered profile. Simply entering a PIN proves advantageous to a user, rather than having to enter both a user ID and a password as in conventional authentication methods. Moreover, since the PIN is not stored, it operates as a secret key known only to the user. This in combination with encrypted software tokens proves a more secure authentication method than conventional techniques. Moreover, the authentication method herein can be applied to accessing multiple profiles—either multiple profiles attributed to corresponding multiple users or the same user with multiple profiles—on a single device.

According to another embodiment, a web server is provided. The web server is adapted for communication with a communication network, such as the Internet. The web server can receive requests for information from a device, such as a remote device, communicatively linked via the Internet. The web server comprises a memory containing at least two software tokens and two user profiles. The two profiles can comprise two separate financial accounts of a single user or financial accounts of two separate users. The web server can also include an execution unit coupled to the memory for fetching instructions from memory. In response to those instructions, the execution unit receives at least two one-time passwords in a request message from the network and, thereafter, determines if correspondence exists between each of the respective two one-time passwords received from the network and each of the two software tokens stored in memory. If such correspondence does exist, the corresponding at least two user profiles are sent.

According to yet another embodiment, a method is provided for authenticating multiple accesses to user profiles stored on a web server. The multiple accesses can occur from a single remote device communicatively coupled to the web server. The method can begin by entering a user identifier and user password into the user interface of the remote device. A PIN is then entered into the user interface of the remote device and an association is formed between the PIN and a corresponding profile indicator stored within and displayed on the user interface. The profile indicator can be created for multiple profiles, each having a respective PIN. The foregoing steps can be repeated to register at least two profile indicators and associated PINs. Once registered, a list of at least two profile indicators is displayed on the user interface of the remote device. One-by-one, a profile indicator can be selected and a corresponding PIN entered for receiving a profile from the web server. That profile corresponds to the registered profile indicator and PIN. This process of access can be repeated by selecting the registered profile indicator, entering the corresponding PIN, and receiving the profile from the web server. Each user need only remember their unique PIN to gain access to their unique profile, even when multiple persons use the same remote device, whether a desktop or laptop computer or a smartphone.

BRIEF DESCRIPTION OF THE DRAWINGS

Other objects and advantages of the invention will become apparent upon reading the following detailed description and upon reference to the accompanying drawings in which.

Figure 1:
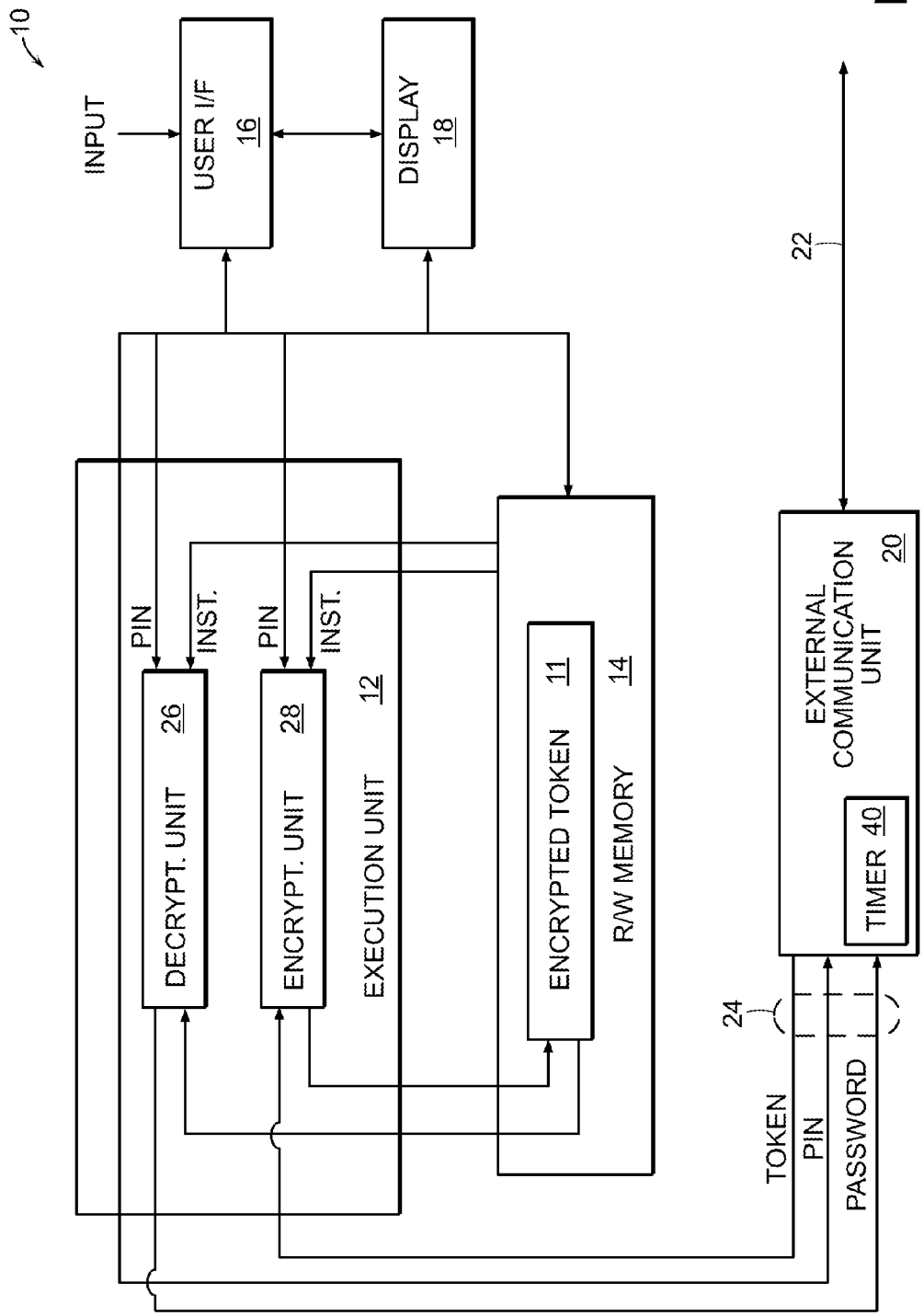
FIG. 1 is a block diagram of a remote device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates a device 10, such as a remote device, that is communicatively coupled to a public network, such as the Internet. Device 10, having an execution unit 12 and memory 14, is generally considered a computational device operating through instructions fetched from the Internet or from memory 14. The instructions can be launched by a user through, for example, user interface 16. The resulting executions arising from user interaction can be shown on display 18.

Device 10 operates as a client and, specifically, a client computing platform containing software. Because device 10 communicates with a web server or other devices via the Internet, device 10 includes an external communication unit 20. Unit 20 operates as a bridge and buffer between an external communication link 22 and bus 24. Like other internal system buses, bus 24 allows communication between execution unit 12 and external communication unit 20. One skilled in the art will appreciate upon reading this disclosure that the architecture of device 10 and the various hardware elements associated with a client device as being one that communicates to other clients or to a host via the Internet. In addition, a skilled artisan will understand the concept of user interface 16 that communicates with display 18 to allow input through, for example, a graphical portion of that user interface. As will be described in more detail below, one type of input would be the entry of a PIN onto a pop-up keyboard of the graphical user interface. The PIN can be used to encrypt a token sent from the external bus through communication unit 20 to bus 24, and then to encryption unit 28. The combination of the token and PIN allows for encryption of that token based on an instruction received from the read/write memory 14. The ensuing encrypted token 11 can then be stored in memory 14. In addition, decryption can occur by entry of the PIN into a decryption unit 26 within execution unit 12. When instructed, decryption unit 26 will decrypt the encrypted token 11 fetched from memory 14. The encrypted token is decrypted by combining it with the PIN used to encrypt the token, and thereafter the decrypted token can be sent as a one-time password.

As shown in FIG. 1, a PIN is used by encryption unit 28 to encrypt a token that is then stored in memory 14. The same PIN can be used to decrypt an encrypted token that is then sent as a one-time password to external communication unit 20. The PIN is not persistently maintained in memory of device 10, so it cannot be intentionally extracted by someone other than the intended user. Instead, the unique, private PIN must be entered each time by the intended user in order for access to be obtained. The cryptology of the private PIN can be one of a symmetric key algorithm that does not require a secure initial exchange of a token. Moreover, the token described herein is preferably a software token. A software token is one that is stored in the memory of the web server connected to device 10 via external link 22. Contrary to hardware tokens where the credentials are stored on a dedicated hardware device, a software token is not in any one person's physical possession; however, software tokens are vulnerable to man-in-the-middle or phishing attacks. Due to the preferred embodiments herein, the software token is stored in the remote device 10 only as an encrypted token. Thus, a malicious intruder is unable to access the software token from memory of device 10 or from a web server. Using symmetric or asymmetric cryptology, a private PIN in combination with an encrypted public PIN or software token ensures an additional layer of authentication similar to that of a two-factor authentication security mechanism.

Figure 2:
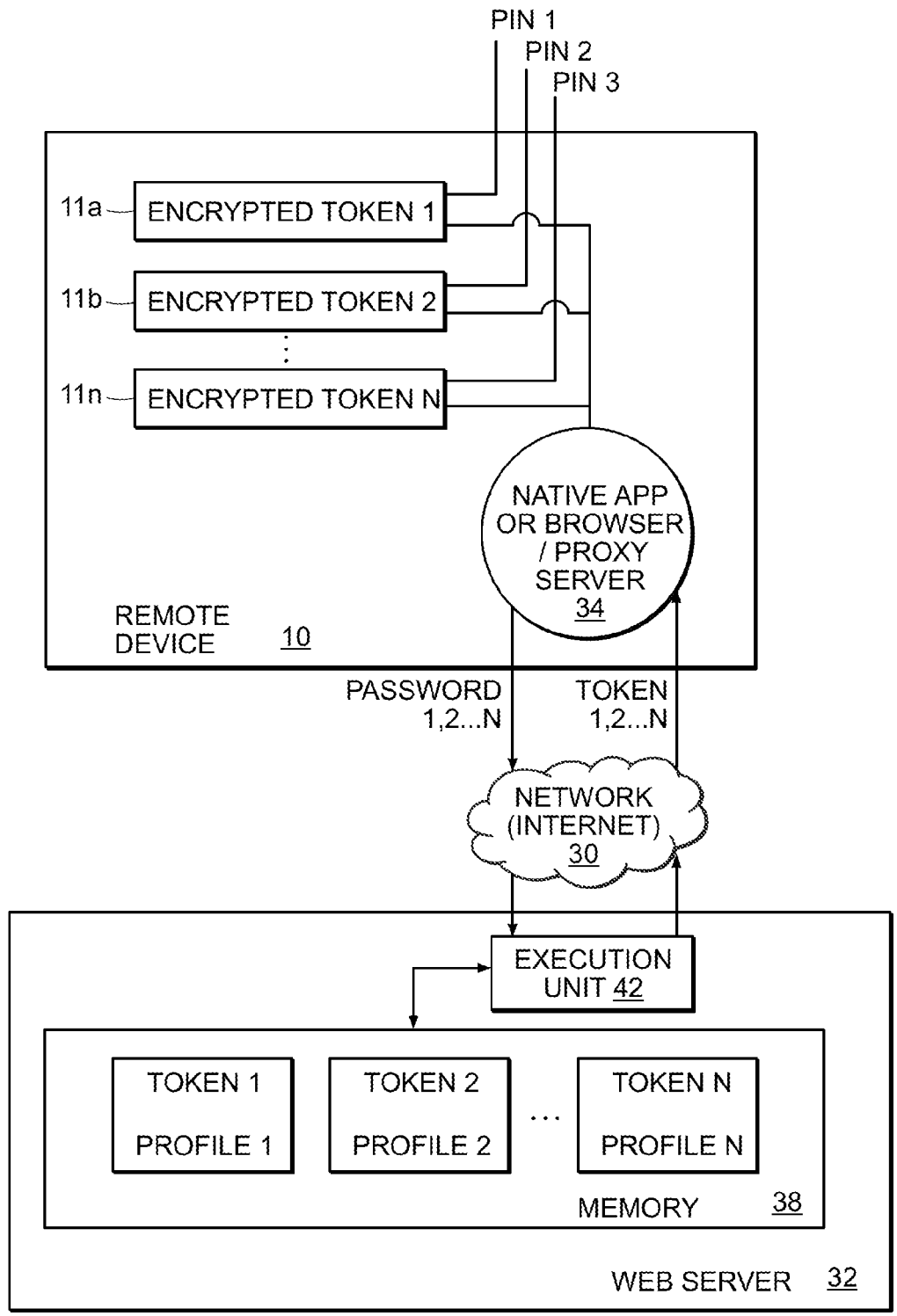
FIG. 2 is a block diagram of the remote device platform communicating over a public network or web with a web server.

FIG. 2 illustrates the computing platform of remote device 10 coupled through an external communication link, network, or Internet 30 to a web server 32. Device 10 operates as a client computing platform containing software, including a native application or web browser and proxy server 34. Communications between device 10 and web server 32 takes place using an appropriate communication protocol, such as the Internet Protocol (IP). The computing platform of device 10 may be run on one or more of a plurality of different operating systems, such as Windows, Mac OS, iOS, Linux, Android, Web OS, etc. A representative platform for a native application could include applications on mobile platforms for accessing messages in multiple formats, such as JSON, XML, and other formats and types of files. A representative platform for a browser and proxy server 34 can include Internet Explorer, Firefox, Safari, Opera, or Chrome, as well as known software applications for accessing hypertext documents in a variety of formats including text files, graphics files, word processing files, Extensible Markup Language (XML), Hypertext Markup Language (HTML), Handheld Device Markup Language (HDML), and other formats and types of files. The proxy server within the browser acts an intermediary for requests from device 10 seeking resources from other servers, such as web server 32. The proxy server services requests, such as file, connection, webpage, or other resources available from web server 32. Proxy server 34 evaluates the request as a way to simplify and control its complexity.

Shown in FIG. 2 is the capability of device 10 storing in its memory multiple encrypted tokens 11a, 11b, etc., through 11n. Each token is drawn from a memory 38 within web server 32. Each token stored in memory 38 is assigned to and corresponds with a respective profile. Multiple tokens can then be drawn from memory 38 and stored as encrypted tokens in the memory of device 10. Encryption is carried out through use of an encryption algorithm, all of which are fairly well known to those skilled in the art. Encryption occurs by using a PIN entered by a user. That PIN is used to uniquely encrypt a token where, as shown, a PIN is assigned to and encrypts respective tokens.

When a user enters a PIN for the first time, that PIN is assigned in association with a user-specific identifier which allows the token to be stored in its encrypted form within device 10. That process is known as the registration process. However, before the PIN is entered, the user ID and password is used to authenticate the device to the web server and, specifically, to authenticate the device to separate profiles stored in the web server. After the registration process (i.e., after the device is authenticated and the PIN is entered and assigned to a unique profile), that PIN can be entered when the profile is to be fetched from memory 38 of web server 32. The process of accessing a profile requires decrypting of the token using the PIN specified during the registration process. The PINs decrypt respective tokens that are stored in their encrypted form, and the decrypted tokens are sent through the proxy server 34 as passwords. Specifically, the passwords are one-time passwords in that they have a time limit as to their validity. As shown in FIG. 1, a timer 40 can be used to effectuate the one-time password feature. An execution unit 42 within web server 32 can parse or decode the various one-time passwords received from device 10 into the corresponding sections of memory 38 to extract and have access to the corresponding profiles. For example, PIN 1 can be used to decrypt only encrypted token 1 within device 10. A one-time password 1 is generated using the decrypted token 1, whereupon the one-time password 1 is sent to retrieve only profile 1 within memory 38. This process can be repeated to access the other profiles, using other encrypted tokens and PINs, as shown in FIG. 2.

Figure 3:
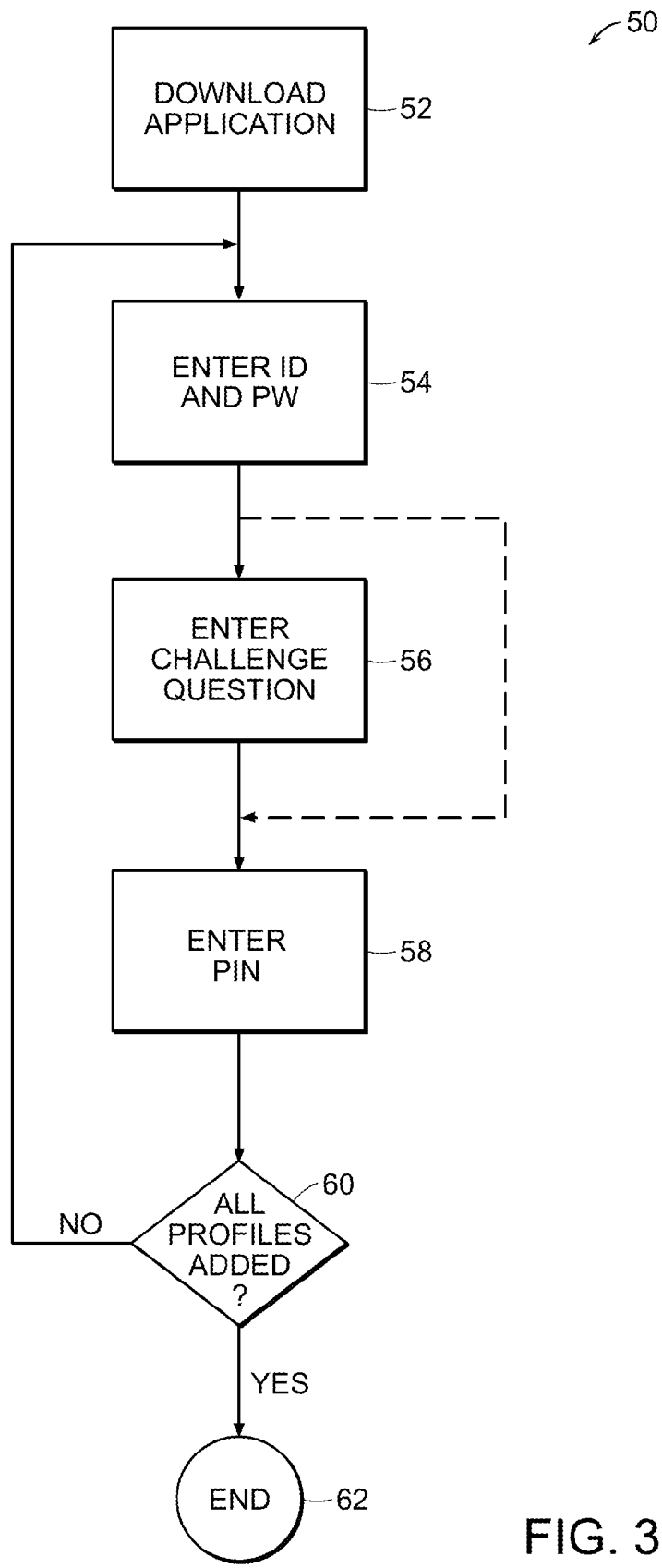
FIG. 3 is a flow diagram of the process for registering one or more profiles of a user and associating a user PIN and software token with each registered profile.

FIG. 3 illustrates the process of registering profiles and, more specifically, illustrates corresponding profile indicators on the display of device 10. The registration process 50 can begin at step 52 by downloading an application to the client device. For example, the user might download application code from an application store, and an icon for that application would appear on the display of device 10 indicating completion of the download process. Once downloaded, the user can enter their ID and password previously associated with that user's profile. The profile is stored in a web server and maintained by an online service institution. However, the web server requires secure, authenticated, and trusted communication between that institution and its users. Examples of institutions having profiles include banks, healthcare providers, or other institutional sites with sensitive or personal information of its customers. A popular type of profile maintained by a bank or financial institution includes checking accounts, money market accounts, savings accounts, etc. of that user, herein referred to as "financial accounts." Of course, for other types of institutions, there are other types of profiles that are not financial in nature, yet specific to the service provided by that institution to the user. All such accounts have one thing in common in that they are meant to be confidential and private to that user. In the example of a bank, a user can have one or more financial accounts; therefore, the user may setup those accounts with a different profile. On the other hand, there may be different users, where each user has previous established a separate profile since they all have different financial accounts that must be kept confidential from one another.

The profile could include certain confidential information besides simply the account balance of a financial account, and could include other personal information, such as a social security number, driver's license number, etc. Nonetheless, according to the embodiments described herein, each profile is unique and has its own user ID and password associated with that specific profile. When the user launches the downloaded application 52, the user will enter the unique ID and password at step 54. In one embodiment, the user is then asked a challenge question and must enter the correct answer at step 56. For example, an institution may have previously established challenge questions and maintains answers provided by the user, e.g., mother's maiden name, favorite pet's name, etc. The user will then enter their PIN at step 58. The same PIN is entered each time for gaining access to the specific profile. The PIN serves to authenticate future accesses and also encrypts tokens stored in the device, as described in more detail below.

Importantly, in addition to registering a single user profile, the present registration process allows for registering multiple profiles. Accordingly, at step 60, a decision block asks if all profiles are added. If all profiles have not been added, the registration process begins again at step 54. Once all profiles are added, the registration process ends at step 62. For example, a user Bob has a checking account and money market account, both of which he registers under his unique profile indicator, named "Bob's Accounts." However, Bob's wife Barbara may want to register her financial accounts on the same device under her unique profile indicator, named "Barbara's Accounts." If desired, this process could continue for each member of the family. Alternatively, for example, Bob could create separate profiles for his personal accounts and business accounts, given the profile indicators "Bob's Personal Accounts" and "Bob's Business Accounts." After performing the registration process steps illustrated in FIG. 3, a profile indicator for each unique profile would be displayed on device 10, giving access to the unique profile only to the specified user.

Figure 4:
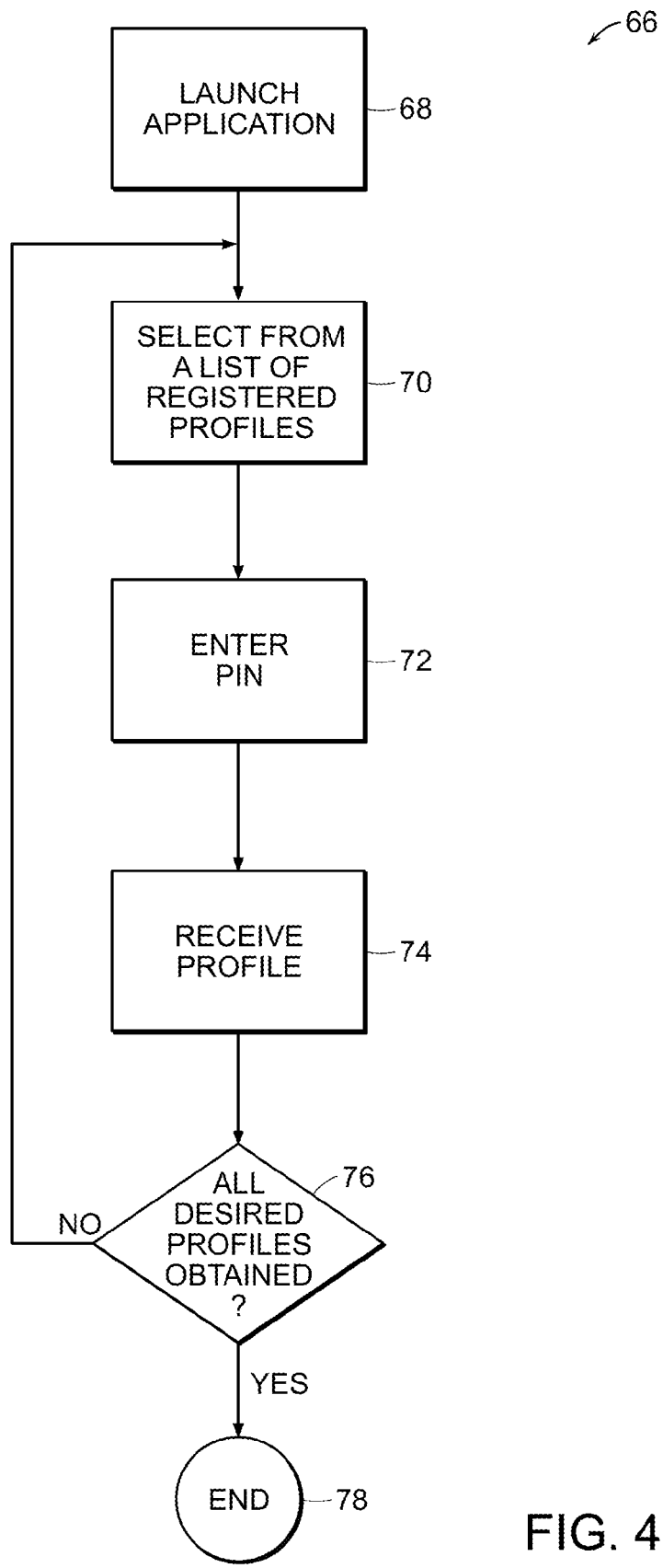
FIG. 4 is a flow diagram of the process for obtaining one or more profiles from a single remote device by one or more users entering a PIN associated with each profile.

Turning now to FIG. 4, after the profiles are registered (FIG. 3), flow diagram 66 illustrates the process steps for obtaining access to the registered profile. At step 68, the application program residing on device 10 is launched, e.g., clicking on the application icon displayed on device 10. Once launched, a list of registered profile indicators is displayed. Using the example above, profile indicators could be listed as "Bob's Accounts" and "Barbara's Accounts." At step 70, one profile is selected by the user, e.g., clicking on the profile indicator displayed on device 10. Once the profile is selected, the user's unique PIN is entered by that user at step 72. The profile is then received at step 74. If there are multiple profile indicators, a decision block 76 asks if all desired profiles are obtained. Using the above example, if Barbara wants to access her profile from the Bob's device, the access steps for Barbara begin again at step 70. This process can be repeated for however many profile indicators are registered. For example, if Bob had created separate profiles for personal and business accounts, a unique profile indicator would be listed for "Bob's Personal Accounts" and "Bob's Business Accounts." When using a mobile device, it proves advantageous and efficient to be granted access by simply entering a PIN that Bob has memorized corresponding to his personal account and his business account, rather than an ID and password each time access is desired. If there are no more registered profiles to be accessed, the application program is closed at step 78.

Figure 5:
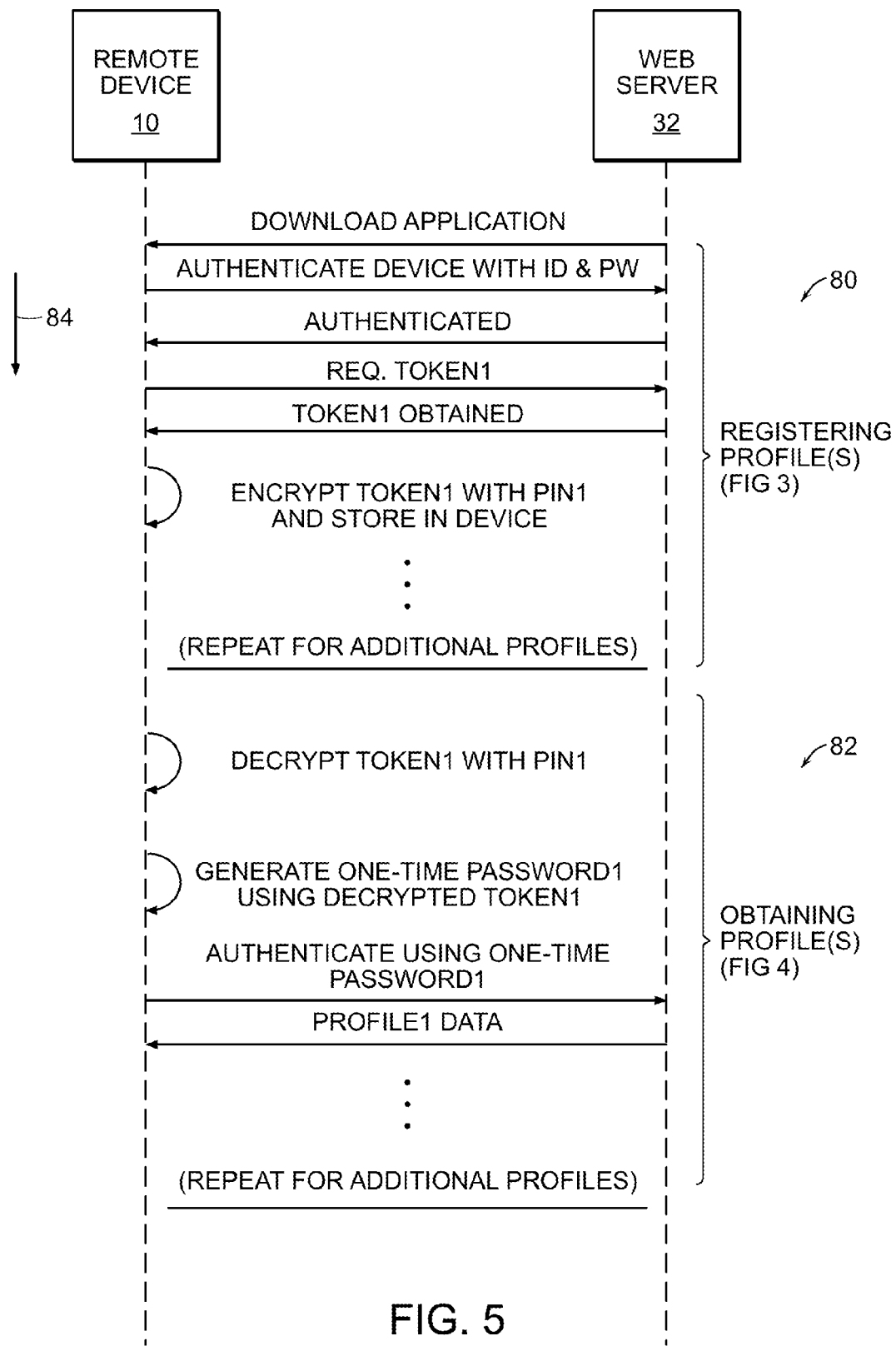
FIG. 5 is a diagram of the communication between the remote device and web server over the network, such as the web, and the various types of activities and signals sent between the remote device and web server.

Turning now to FIG. 5, a time diagram is shown along with the various signals sent between remote device 10 and web server 32. The timing of signals begins with registering the profiles 80 (FIG. 3). Thereafter, the profiles are obtained 82 (FIG. 4). In timed sequence, with ascending time 84, the registering profiles 82 begins with downloading the application from web server 32, and storing the application in device 10. For example, a bank web server may have available an application that a user can download to their device which, according to a preferred embodiment is a mobile device. Once downloaded, the user authenticates the device with their unique ID, password, and PIN created with the particular institution. Once the user device is authenticated, token1 is requested from web server 32, and token1 is then forwarded to device 10. Token1 is obtained using an encryption such as SSL/TLS on the network communication between web server 32 and device 10. However, token1 can be encrypted while resident on device 10 when the user enters their unique PIN. PIN1 can be associated with token1, while PIN2 can be associated with token2, etc., such that the registration can be repeated for additional profiles.

After one or more tokens and associated PINs are registered, only the encrypted token is maintained and stored in device 10. The PIN is not stored within device 10 and is a secret key known only to the user. Obtaining the profile 82 begins by decrypting each token with its corresponding PIN. For example, token1 is decrypted with PIN1. A one-time password, e.g., password1, is generated using the decrypted token1. In this example, password1 is then sent from device 10 to web server 32 to authenticate device 10, at which time the profile, e.g., profile1, is forwarded to device 10. This process can be repeated for up to however many profiles are registered on device 10.

Figure 6:
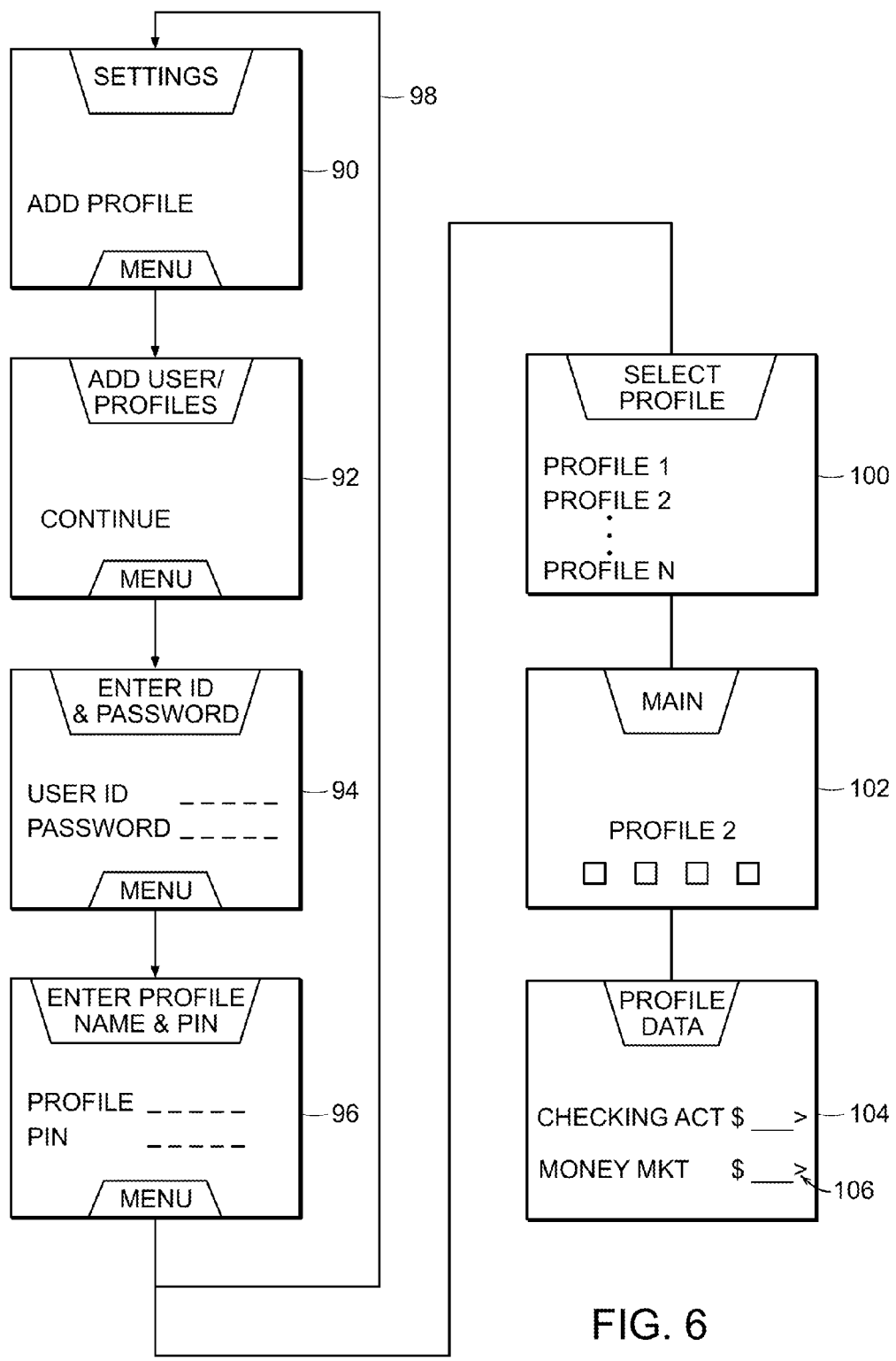
FIG. 6 is diagram of the various screen shots shown on a remote device illustrative of registering one or more profiles and thereafter gaining access to one or more profiles stored on a web server.

FIG. 6 illustrates examples of various screen shots of the embodiments described herein after the subject application program has been downloaded to a remote device. Screen 90 might prompt a user to add a profile. After clicking "add profile," screen 92 might prompt a user to verify they wish to "continue." If so, screen 94 requests entry of the user ID and password, as previously setup with the particular institution. Once the user ID and password are entered, screen 96 then requests the user to name their profile (i.e., given their profile a profile indicator name that would thereafter appear in screen shot 100). The user is also prompted to enter a PIN to be associated with that given profile indicator name. If there are additional profiles to be entered 98, the process begins again at screen 90. Once all the profiles are registered, each profile indicator can be listed as shown in screen 100. Using the examples herein, there may be a profile indicator for Bob's Personal, Bob's Business, and Barbara's Accounts. There is no limit to the number of profiles that can be created. If "profile 2" is selected, screen 102 prompts the user to enter the PIN previously registered for that unique profile. Once the PIN is correctly entered by the user, screen 104 reflects the accounts associated with that unique profile. An account can be selected by clicking on icon 106, which shows that account's activity, such as withdrawals, deposits, etc. There can be other transactions implemented by clicking icon 106, such as bill pay, for example. Thus, "access" includes not only being able to see the account information stored on a web server, but also perform transactions within that account, all from a remote device. Most importantly, the preferred embodiments herein allow access to multiple profiles from a single device—whether a single user has multiple accounts or a family wishes to have multiple persons using one device. Once the profiles and associated accounts are registered, each individual need only remember their specific PIN in order to gain access to their profile.

Further modifications and alternative embodiments of various aspects of the invention will be apparent to those skilled in the art in view of this description. It is intended that the following claims be interpreted to embrace all such modifications and changes and, accordingly, the specification and drawings are to be regarded in an illustrative rather than a restrictive sense.

What is claimed is:

1. A device configured for communication with a web server via a communication network, wherein the web server comprises a memory containing at least two user profiles and at least two tokens corresponding to the at least two user profiles, said device comprising:
 a user interface configured to receive only personal identification numbers (PINs) from a user and, specifically, a first PIN and a second PIN, respectively associated with a first profile indicator and a second profile indicator displayed on a display communicatively coupled to the user interface;
 a communication unit operatively coupled to the communication network for receiving a first token corresponding to a first user profile and a second token corresponding to a second user profile from the web server via the communication network;
 an encryption unit operatively coupled to the communication unit for encrypting the first token using the first PIN and encrypting the second token using the second PIN;
 a second memory operatively coupled to the encryption unit for storing the first encrypted token and the second encrypted token;
 a hardware processor operatively coupled to the second memory for fetching the first encrypted token and the second encrypted token upon the user selecting the first profile indicator and the second profile indicator on the display, respectively, and the user interface receiving the first PIN and the second PIN, respectively;
 wherein said communication unit is configured for:
  sending to the web server via the communication network a first password generated from a combination of the first encrypted token and the first PIN and also for sending a second password generated from a combination of the second encrypted token and the second PIN; and
  receiving from the web server via the communication network the first user profile associated with the first password and the second user profile associated with the second password.

2. The device according to claim 1, wherein the user interface comprises a touch screen.

3. The device according to claim 1, wherein the user interface comprises a graphical user interface and an input device selected from a group consisting of a pop-up keyboard and a mouse.

4. The device according to claim 1, wherein the user interface is downloaded over the communication network as an application program appearing as an icon on the display of the device, wherein the first PIN and the second PIN are entered into fields of a screen displayed upon execution of the application program.

5. The device according to claim 1, wherein the communication network is a public telecommunications network or the Internet.

6. The device according to claim 1 is selected from a group consisting of a hand-held digital assistant, a smart phone, and a network client device.

7. The device according to claim 1, further comprising a decryption unit within the hardware processor to receive the first encrypted token and the second encrypted token that are fetched from the second memory, wherein the decryption unit is configured for decrypting the first encrypted token and the second encrypted token using the first PIN and the second PIN, respectively, before sending the decrypted forms of the first token and the second token to the communication unit as the first password and the second password.

8. The device according to claim 1, further comprising a timer that disables the first password and the second password after a timeout.

9. The device according to claim 1, wherein the first user profile and the second user profile comprise financial account information of two different users.

10. The device according to claim 1, wherein the first user profile and the second user profile comprise two different financial accounts of a single user.

11. The device according to claim 1, wherein the first PIN and the second PIN are not persistently maintained within the second memory.

* * * * *